United States Patent [19]
Lin et al.

[11] Patent Number: 5,911,137
[45] Date of Patent: Jun. 8, 1999

[54] METHOD AND APPARATUS FOR SHARING A COMMUNICATION SYSTEM

[75] Inventors: Jyh-Han Lin, Fort Worth; Pavan Jyotsna Achyutuni, North Richland Hills; Sachin Waman Danait, Irving; Alain Charles Louis Briancon, McKinney; Casey Thomas Hill, Trophy Club, all of Tex.

[73] Assignee: Motorola, Inc., Schaumburg, Ill.

[21] Appl. No.: 08/680,737

[22] Filed: Jul. 15, 1996

[51] Int. Cl.⁶ ................................................. G06F 17/60
[52] U.S. Cl. ........................ 705/37; 705/39; 340/825.35
[58] Field of Search ................... 705/26, 27, 35, 705/39, 37; 340/825.35

[56] References Cited

U.S. PATENT DOCUMENTS

| | | | |
|---|---|---|---|
| 4,506,384 | 3/1985 | Lucas | 455/51 |
| 5,103,445 | 4/1992 | Ostlund | 370/79 |
| 5,537,414 | 7/1996 | Takiyasu et al. | 370/95.1 |
| 5,657,317 | 8/1997 | Mahany et al. | 370/338 |
| 5,754,946 | 5/1998 | Cameron et al. | 455/38.1 |

*Primary Examiner*—Allen R. MacDonald
*Assistant Examiner*—Michele Stuckey Crecca
*Attorney, Agent, or Firm*—R. Louis Breeden

[57] ABSTRACT

A communication system (100) includes a shared communication medium, such as a communication channel or a base station, for providing messages and transmission devices (110) for transmitting the messages over the shared communication medium during sharing periods defined by a sharing pattern (114). A trading center (105) coupled to the transmission devices (110) modifies the sharing pattern (114) in response to traffic handled by the transmission devices (110).

18 Claims, 7 Drawing Sheets

METHOD AND APPARATUS FOR SHARING A COMMUNICATION SYSTEM

FIELD OF THE INVENTION

This invention relates in general to communication systems, and more specifically to communication systems in which a communication medium can be shared.

BACKGROUND OF THE INVENTION

Communication systems, such as wireless communication systems, commonly include radio frequency controllers (RFCs), each of which transmits messages to receiving devices located in a transmission zone, i.e., a geographic area, associated with an RFC. RFCs that are associated with transmission zones that overlap or in which interference from other zones could result often share one or more communication media. For example, when two zones overlap, the RFCs associated with the overlapping zones could share a base station located in the overlapping region. Different RFCs could also share a communication channel, e.g., a communication frequency. In sharing situations, a first RFC transmits using the shared medium, e.g., channel or base station, while a second RFC refrains from transmission using the shared medium. Once the first RFC has completed its use of the shared medium, the second RFC can begin transmissions over the medium.

Typically, a communication medium is shared according to a default sharing pattern. The sharing pattern could, for instance, specify frames of a signal or times of day that are assigned to the different sharing RFCs. However, this method of sharing a communication medium is inefficient because, during any assigned time, the RFC to which the medium is currently assigned may have no need for transmission services. At the same time, other RFCs awaiting availability of the medium may be fairly busy but have no way to transmit messages.

Thus, what is needed is a more effective way of managing shared media in a communication system.

DESCRIPTION OF A PREFERRED EMBODIMENT

Figure 1:
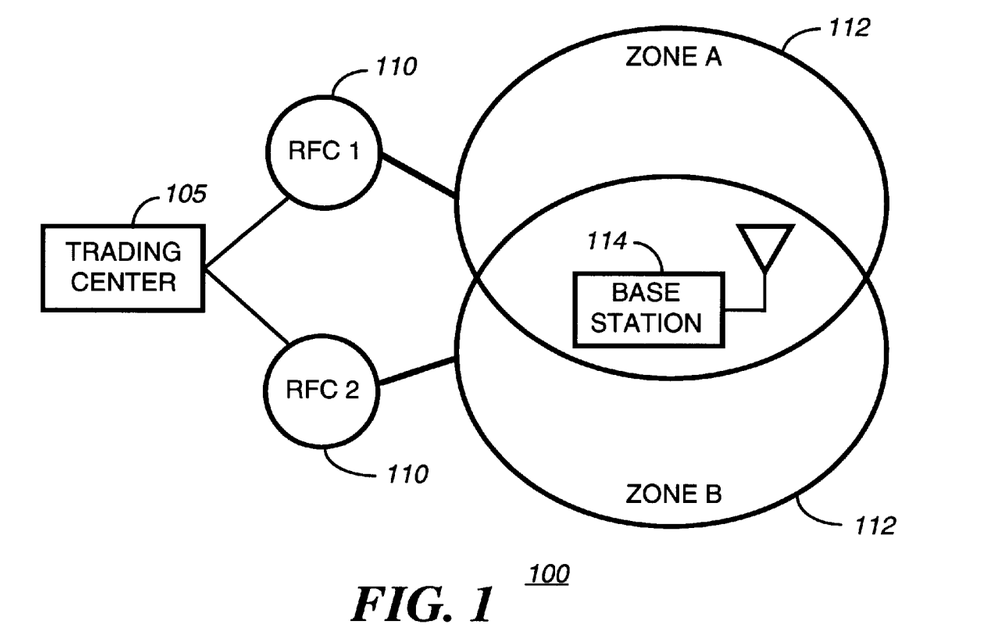
FIG. 1 illustrates a communication system comprising radio frequency controllers for sharing a communication medium and a trading center for managing the sharing of the medium in accordance with the present invention.

FIG. 1 is an illustration of a communication system 100, such as a radio frequency communication system in which transmission devices, such as radio frequency controllers (RFCs) 110, control the transmission of messages in geographic areas, i.e., transmission zones 112. A first RFC 110 (RFC1) can, for instance, control message delivery in Zone A, while a second RFC 110 (RFC2) can control message deliver in Zone B. In this manner, portable receiving units (not shown) located in Zone A usually receive messages provided by RFC1, and portable receiving units located in Zone B usually receive messages provided by RFC2.

RFCs 110 within the communication system 100 are able to share communication media. A shared communication medium preferably comprises a base station 114 for receiving or transmitting information and/or a radio frequency communication channel, or frequency. By way of example, when transmission zones overlap, as shown, a base station 114 can be located in the overlapping region and thus shared by two or more RFCs 110. In situations in which transmissions of different RFCs 110 could cause interference, two or more RFCs 110 could share a communication channel. Only two RFCs 110 and two transmission zones 112 are depicted for purposes of convenience. It will be appreciated by one of ordinary skill in the art that a greater number of RFCs and transmission zones are typically included within the communication system 100. It will further be appreciated that a communication medium, e.g., a base transmitter, base receiver, base transceiver, or communication channel, could be shared by many different RFCs, as long as each sharing RFC is allocated sufficient resources for message transmission.

According to the present invention, a trading center 105 is included in the communication system 100 for managing sharing of the communication medium. The trading center 105 could, for instance, comprise another RFC or even be included within one of the RFCs 110 for communicating within the system 100. The trading center 105 preferably monitors traffic at the RFCs 110 through reception of requests from RFCs 110 for greater transmission resources. Additionally, the trading center 105 is informed of situations in which an RFC 110 has completed message transmission prior to expiration of its allocated transmission resources. The trading center 105 can then advantageously manage the sharing of the communication medium.

Figure 2:
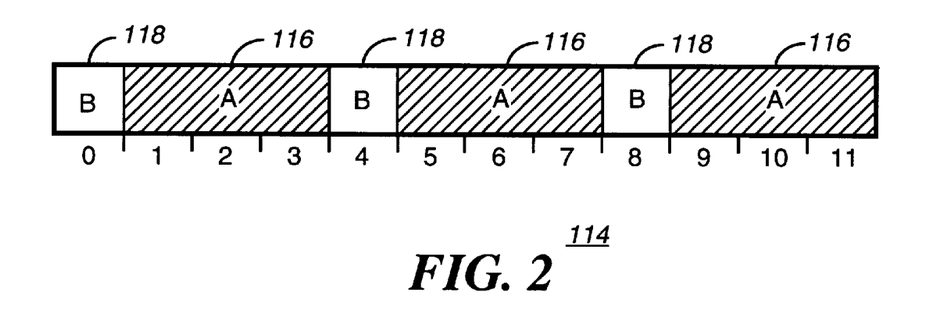
FIG. 2 is a timing diagram illustrating an example of a default sharing pattern in the communication system of FIG. 1 in accordance with the present invention.

FIG. 2 is a timing diagram of an example of a default sharing pattern 114 that can be used to allocate the shared communication medium between or among RFCs. According to the pattern 114, first sharing periods 116, i.e., allocations of the shared medium, are reserved for use by a first RFC. Second sharing periods 118 are reserved for use by a second RFC. When the sharing pattern 114 allocates time, it can be seen that every fourth time slot is reserved for the second RFC, while the remaining time is allocated to the first RFC. When the sharing pattern 114 allocates frames of a signal, for instance, the sharing pattern 114 indicates that Frames 0, 4, 8, . . . are allocated to the second RFC and that Frames 1–3, 5–7, 9–11, . . . are allocated to the first RFC. One of ordinary skill in the art will recognize that any allocation method can be used as long as each RFC is able to determine which sharing periods are reserved for its use and which are not. The depicted sharing pattern 114 merely illustrates one way of reserving sharing periods for different RFCs.

According to the present invention, the sharing pattern is stored by the trading center 105 and by the RFCs that share the communication medium. Each device is therefore able to determine which RFC is assigned to which sharing periods. When an RFC to which the current sharing period is assigned determines that it has no further need for transmission during the current period, the RFC notifies the trading center 105 that the remainder of the period can be "sold", i.e., used by another RFC. When an RFC to which the current sharing period is not assigned determines that it has numerous messages awaiting transmission, it can notify the trading center 105 that it would like to buy time, if available. The trading center 105 according to the present invention manages the buy and sell transactions among the RFCs and also modifies the default sharing period when necessary. The modification of the sharing period, which can occur automatically and without intervention of a human operator, results in a modified sharing pattern that is distributed to the RFCs. The RFCs preferably replace the older sharing pattern with the modified sharing pattern and subsequently use the modified pattern in sharing the communication medium.

In conventional communication systems, a sharing pattern, i.e., a synchronization pattern, indicates the times during which a communication channel is used by a central transmitter and one or more local transmitters. When the central transmitter is not backlogged with messages for delivery, the central and local transmitters are keyed and dekeyed according to the sharing pattern. However, when the central transmitter is backlogged, it can override the sharing pattern and remain keyed until its messages have been transmitted. Additionally, the central transmitter can transmit during unused portions of the sharing pattern that are assigned to the local transmitters. However, no provisions exist for the buying and selling of time between the central and local transmitters, and no provisions exist for allocating additional time to the local transmitters, when needed. As a result, the local transmitters can become backlogged, resulting in overcrowding of the channel and in message delays.

In prior art systems, the sharing transactions, i.e., the use of one transmission device's allocation by another, are not monitored by any central device. Therefore, there is no long term record of deviations from the sharing pattern. The trading center 105 according to the present invention conveniently alleviates this problem by monitoring buy and sell requests and completed sharing transactions. As a result, the costs associated with use of the shared medium can be allocated in a manner that reflects actual use of the medium. Additionally, long term monitoring of buy and sell transactions between RFCs permits the modification of the sharing pattern by the trading center 105 to allocate resources in a manner which better approximates message delivery needs of the different RFCs.

Figure 3:
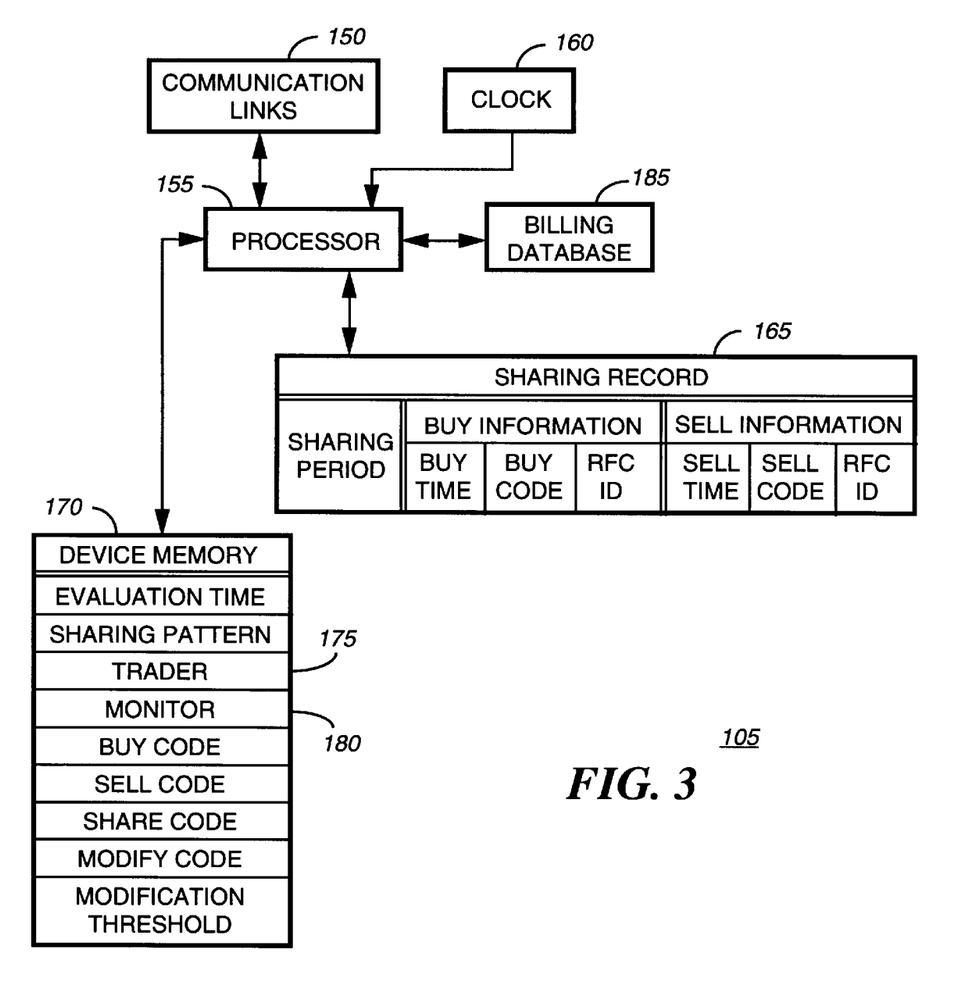
FIG. 3 is an electrical block diagram of the trading center included in the communication system of FIG. 1 in accordance with the present invention.

Referring next to FIG. 3, an electrical block diagram of the trading center 105 is shown. The trading center 105 comprises communication links 150 for communicating with the RFCs 110 (FIG. 1) that share one or more communication media. The communication links 150 can be, for instance, radio frequency communication links, wireline links, or any other communication channel for coupling the trading center 105 to the RFCs. The trading center 105 further includes a processor 155 for controlling operations of the trading center 105, a clock 160 for providing time values to the processor 155, and a billing database 185 for maintaining records indicative of time actually used by the RFCs. It will be appreciated that the actual time used by RFCs can differ from the allocations defined by the sharing pattern as a result of completed sharing transactions in the communication system 100.

A device memory 170 is also included in the trading center 105 for storing device information, such as a default sharing pattern, an evaluation time indicative of times at which the trading center 105 verifies the sharing pattern, and a modification threshold that, when exceeded, results in modification of the default sharing pattern. Additionally, the device memory 170 stores a buy code for recognizing requests for additional transmission resources from RFCs during unassigned sharing periods, a sell code for recognizing notifications from an RFC that it does not need to transmit during an assigned sharing period, a share code for alerting buying and selling RFCs that a sharing transaction is to commence, and a modify code for informing RFCs that a modified sharing code is to subsequently be used for sharing purposes. The trading center 105 also includes a sharing record 165 for storing the buy and sell requests from different RFCs during each sharing period. In this manner, a buy request can in some instances be matched with a sell request to permit an RFC to transmit during a sharing period to which it is not assigned by the sharing pattern.

A trader 175 included in the trading center 105 manages the buy and sell requests from sharing RFCs and attempts to effect sharing transactions that deviate from the default sharing pattern. A monitor 180 monitors the buy and sell requests over periods of time, e.g., a week at a time, to determine whether the sharing pattern meets the transmission needs of the different RFCs. The monitor 180 modifies the sharing pattern when necessary. The trader 175 and the monitor 180 are preferably implemented as firmware stored in the device memory 170 and executed by the processor 155. Alternatively, the trader 175 and the monitor 180 can be implemented using hardware capable of performing equivalent operations.

Figure 4:
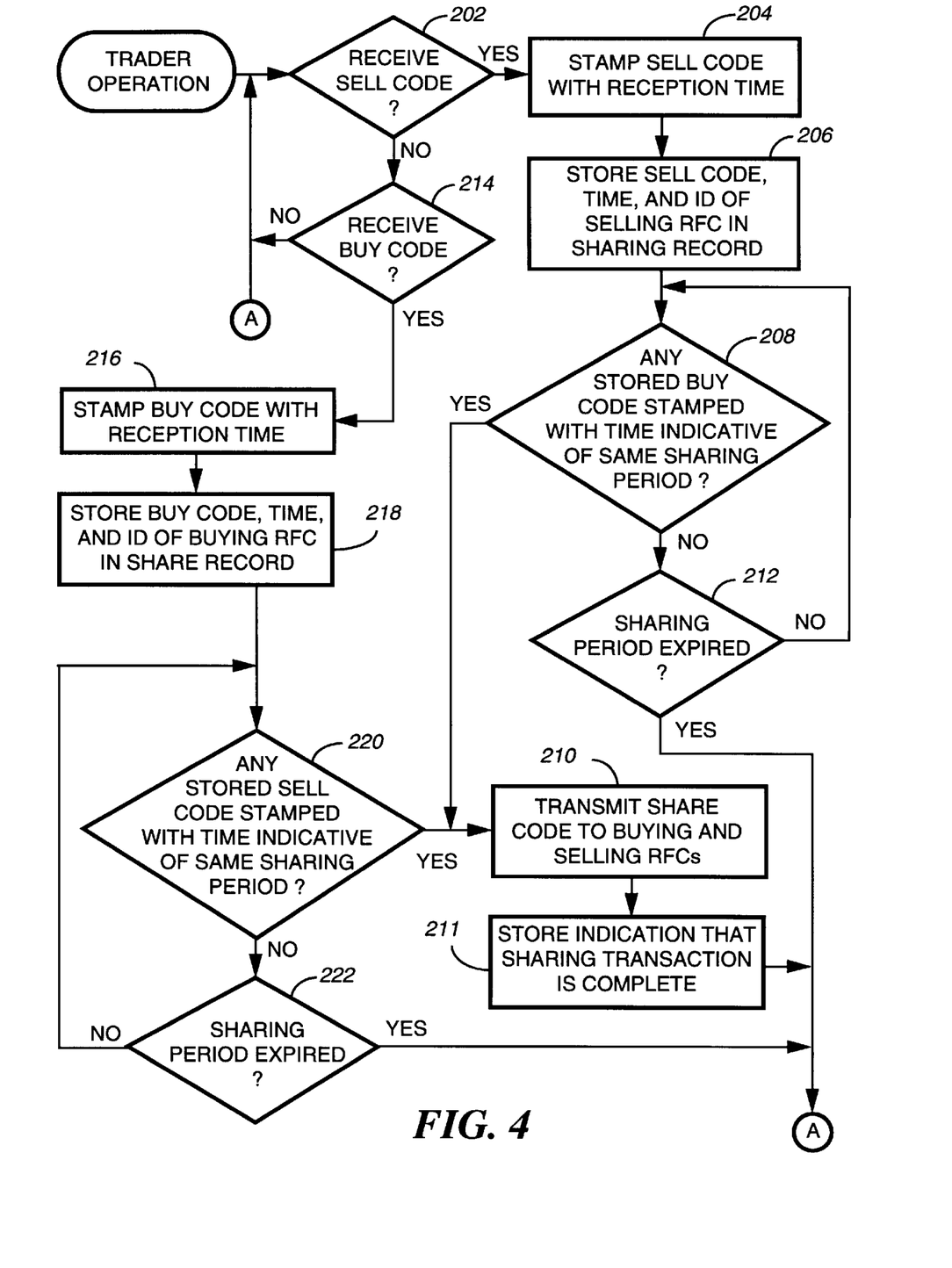
FIG. 4 is a flowchart depicting an operation of a trader included in the trading center of FIG. 3 in accordance with the present invention.

FIG. 4 is a flowchart of an operation of the trader 175, which, at step 202, receives a sell code from an RFC via the communication links 150 (FIG. 3). The trader 175 stamps the sell code with the reception time, at step 204, then stores the sell code, the reception time, and information that identifies the selling RFC in the sharing record 165, at step 206. The trader 175 subsequently references the sharing record 165 to determine, at step 208, whether another RFC has transmitted a buy code to attempt a buy transaction in the same sharing period. When the trader 175 matches up a buy code and a sell code for the same sharing period, the share code is transmitted, at step 210, to the buying and selling RFCs informing them that trading should commence. Specifically, the share code causes the selling RFC to cease transmission over the shared communication medium and the buying RFC to begin transmission over the shared communication medium.

At step 211, the trader 175 stores an indication that the sharing transaction is complete in the billing database 185. For billing purposes, it may also be desirable to store information identifying the buying and selling RFCs as well as the time during which the buying RFC actually uses the unassigned sharing period.

In cases where more than two RFCs share a communication medium, the trader 175 preferably also stores an indication of the completed sharing transaction in the sharing record 165 so that additional buy or sell requests from other RFCs are not inadvertently matched with a buy or sell request that has already been processed. It will be appreciated that information identifying the sharing pattern that has been varied should also be stored when more than one communication medium is shared among system RFCs. When, for instance, a communication channel and a base station are shared, each medium is preferably associated with a sharing pattern. Therefore, the sharing record should indicate to which sharing pattern a completed sharing transaction refers. In this manner, a sharing transaction with respect to a first communication medium, e.g., a communication channel, can be distinguished from a sharing transaction with respect to a second communication medium, e.g., a base station or a different communication channel.

When, at steps 208, 212, a received sell code cannot be matched with a buy code but the sharing period has not yet expired, the trader 175 continues to monitor the sharing record 165 to match up buy and sell codes that refer to the same sharing period. When, at step 212, the current sharing period has expired, the trader 175 awaits reception of buy and sell codes in subsequent sharing periods.

At step 214, when a buy code is received, the buy code is stamped with the reception time, at step 216. Next, at step 218, the buy code, the reception time, and information identifying the buying RFC are stored in the sharing record 165. When, at step 220, a sell code for the same sharing period has been received, the trader 175 begins the sharing process, at step 210. The trader 175 continues to monitor the sharing record 165 until the sharing period expires, at step 222.

In accordance with another embodiment of the present invention, RFCs that attempt to buy additional time during unassigned sharing periods could place bids for the additional time, rather than merely requesting the time. Also, a selling RFC could post an asking price, rather than merely a sell request. In such an embodiment, the sharing record 165 would include not only a buy code for each buying RFC, but also a bid, e.g., a price, that the RFC is willing to pay for the additional time. When a bid from a buying RFC equals or exceeds the price asked by the selling RFC, the trader 175 matches the two requests and transmits the sharing code to both RFCs. Thereafter, the trader 175 stores billing information in the billing database 185 to indicate that the additional time has been purchased at the price bid by the buying RFC.

According to the alternate embodiment of the present invention, when no buying RFC has met the asking price of the selling RFC, the trader 175 could transmit information to both buyers and sellers indicating that potential buyers and sellers exist, but that the price has not yet been met. When subsequent bids or asking prices are then received by the trader 175, sharing transactions can be commenced if the desired buying and selling prices can be matched.

In this manner, a capitalistic system is provided in which a selling RFC is not restricted by any set price. Instead, the selling RFC can "hold out" for the highest bid from a buying RFC, thereby receiving the most compensation for the transmission resources that have been released for use by another RFC.

Figure 5:
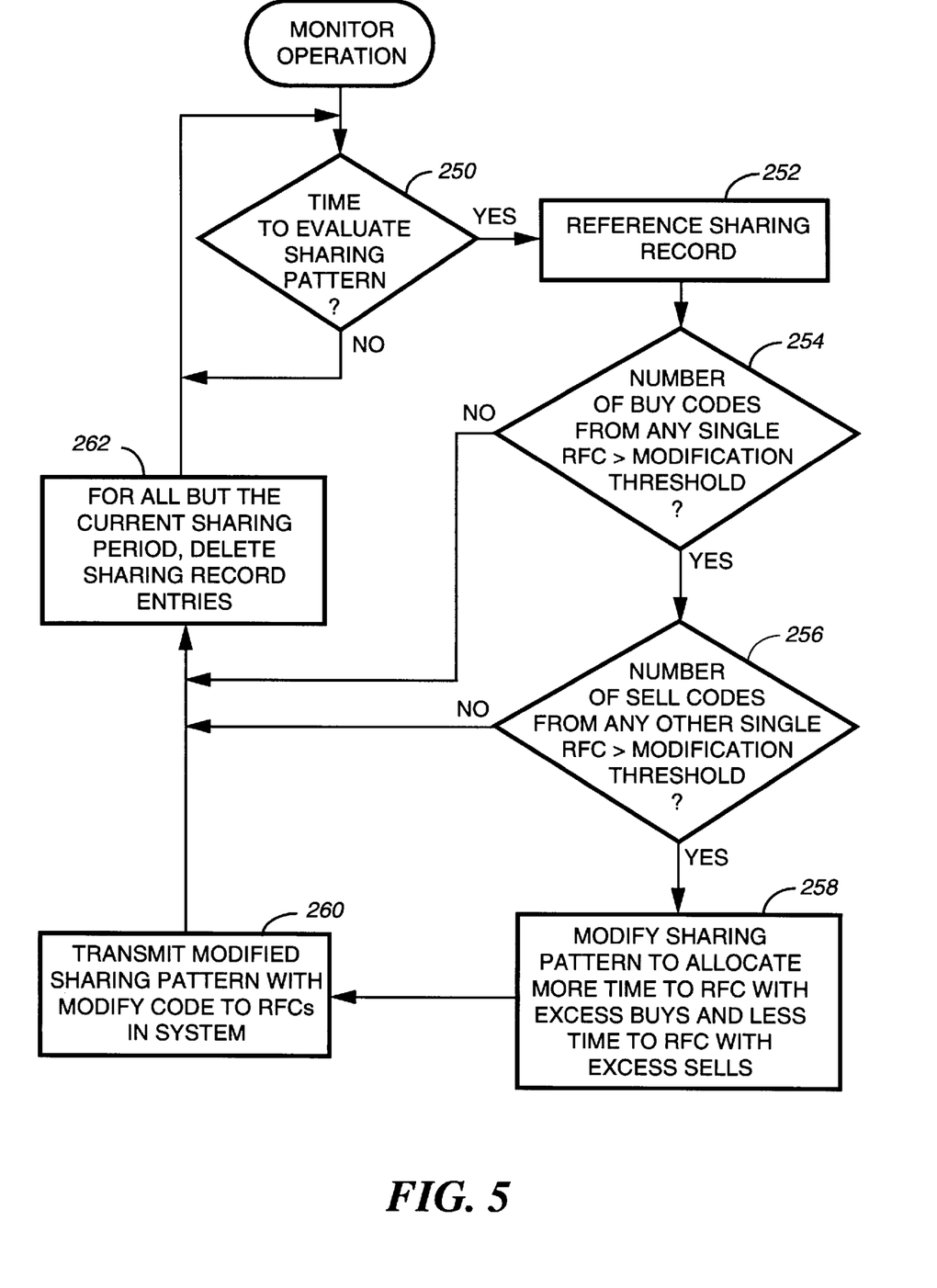
FIG. 5 is a flowchart of an operation of a monitor included in the trading center of FIG. 3 in accordance with the present invention.

FIG. 5 is a flowchart of an operation of the monitor 180, which, at step 250, references the stored evaluation time and the clock 160 to determine whether it is time to verify the stored sharing pattern. When it is time to verify the pattern stored in the device memory 170, the sharing record 165 is referenced, at step 252. When, at steps 254, 256, the number of buy codes from a single RFC exceeds the stored modification threshold and the number of sell codes from a different RFC exceeds the modification threshold, the sharing pattern is modified, at step 258. Specifically, the sharing pattern is modified to allocate more transmission resources to the RFC having the excess buy attempts and to allocate less transmission resources to the RFC having the excess sell attempts. The modified sharing pattern is then transmitted, at step 260, to the RFCs that share the communication medium to which the sharing pattern refers. At step 262, sharing record entries that refer to the modified sharing pattern are deleted after modifying the sharing period or after determining, at steps 254, 256, that the sharing pattern is not to be modified at this time.

Because the trader 175 will continue to store information about further sharing periods, the monitor 180 can conveniently determine when the next verification time arrives by referencing the clock 160 to determine when the current time is equal to or greater than the evaluation time plus the time associated with the next sharing period information entered by the trader 175. Other methods of determining verification times of the monitor 180 could alternatively be used. For instance, the monitor 180 could determine the time at which the current verification has occurred, then calculate the next verification time by reference to the stored evaluation time.

According to the present invention, the modification threshold could comprise a value, e.g., a number, or a rate to which numbers of buy and sell attempts of different RFCs are compared. For instance, the modification threshold could comprise a rate of "twenty requests per week" or merely a number value, e.g., twenty, that is processed with respect to the amount of time that has elapsed between verifications by the monitor 180.

Exceeding the modification threshold could result in modification of the sharing pattern in any of numerous ways. When, for instance, the sharing periods of the pattern comprise one or more frames of a signal, the sharing pattern could be modified in increments of one frame. More specifically, excess buy and sell attempts by different RFCs could result in assignment of one additional frame per sharing period for the buying RFC and one less frame per sharing period for the selling RFC. Alternatively, when the sharing periods comprise time periods, the sharing pattern could be altered in increments of a predetermined number of seconds, minutes, or even hours.

The monitor 180 according to the present invention provides a means for conveniently modifying the sharing pattern automatically and without intervention of a human operator. As a result, the sharing pattern can be modified very rapidly, resulting in efficient and quick changeover to a new pattern that more efficiently utilizes transmission resources of the shared communication medium.

Figure 6:
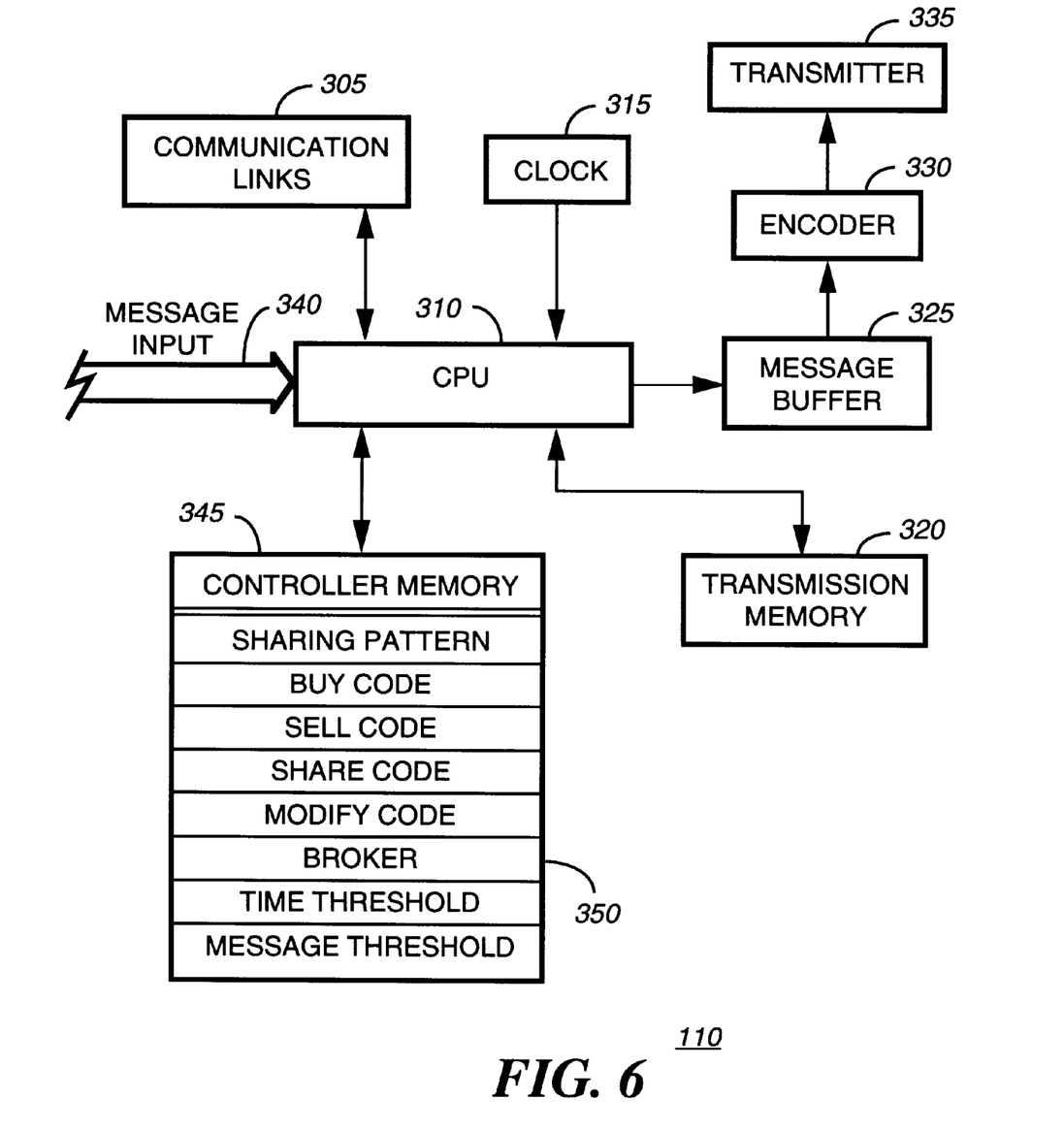
FIG. 6 is an electrical block diagram of a radio frequency controller included in the communication system of FIG. 1 in accordance with the present invention.

FIG. 6 is an electrical block diagram of a transmission device, such as an RFC 110, for sharing a communication medium within the communication system 100. The RFC 110 comprises communication links 305 for coupling to the trading center 105, a central processing unit (CPU) 310 for controlling operations of the RFC 110, and a clock 315 for providing time values to the CPU 310. The RFC 110 receives transmission information, e.g., messages, via conventional message input means 340, such as a data port or modem coupled to a telephone network. The messages for transmission are stored in a transmission memory 320 and moved into a message buffer 325 when it is time for transmission. Messages are then encoded according to a signaling format, such as the FLEX™ signaling protocol, and transmitted within the associated transmission zone 112 (FIG. 1) by the transmitter 335. It will be appreciated that the transmitter 335 could comprise various forwarding devices, such as data ports, for forwarding messages to base transmitters located remotely within the transmission zone 112.

The RFC 110 also includes a controller memory 345 for storing controller information such as the sharing pattern used in transmitting over the shared medium, the buy code, the sell code, the share code, and the modify code. Additionally, a time threshold and a message threshold are preferably stored for use in making buy and sell requests that are provided to the trading center 105. A broker 350 included in the RFC 110 monitors the message delivery needs of the RFC 110 and the transmission resources allocated to the RFC 110 by the sharing pattern and requests variation from the sharing pattern when necessary. The broker 350 is preferably implemented in firmware stored in the controller memory 345 and executed by the CPU 310. Alternatively, the broker 350 can be implemented by hardware capable of performing equivalent operations.

Figure 7:
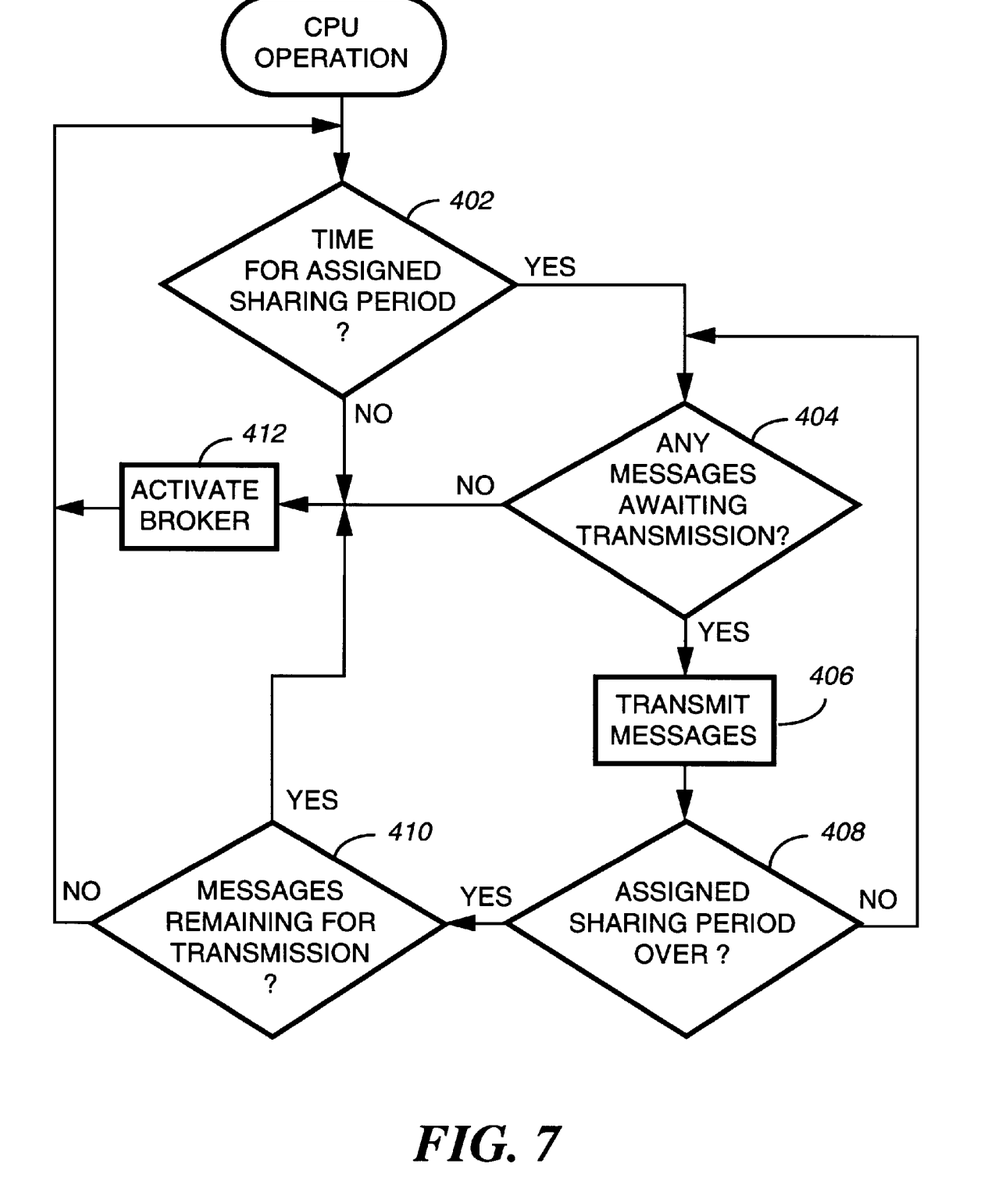
FIG. 7 is a flowchart of an operation of a central processing unit included in the radio frequency controller of FIG. 6 in accordance with the present invention.

Referring next to FIG. 7, a flowchart of an operation of the CPU 310 is shown. When, at step 402, the current sharing period is determined to be an assigned period, the CPU 310 determines by referencing the transmission memory 320 whether any messages await transmission, at step 404. When so, messages are transmitted, at step 406, over the shared communication medium. As long as messages are to be transmitted, message transmission continues until the current assigned sharing period expires, at step 408. When, at steps 408, 410, the sharing period is over but messages still await transmission, the broker 350 is activated, at step 412, to determine whether to make a buy request. The broker 350 is also activated for a determination of whether a buy request should be made when, at step 402, the CPU 310 determines that the current time is not an assigned sharing period. When, at step 404, no messages await transmission during an assigned period, the broker 350 is activated, at step 412, to determine whether a sell request should be made.

Figure 8:
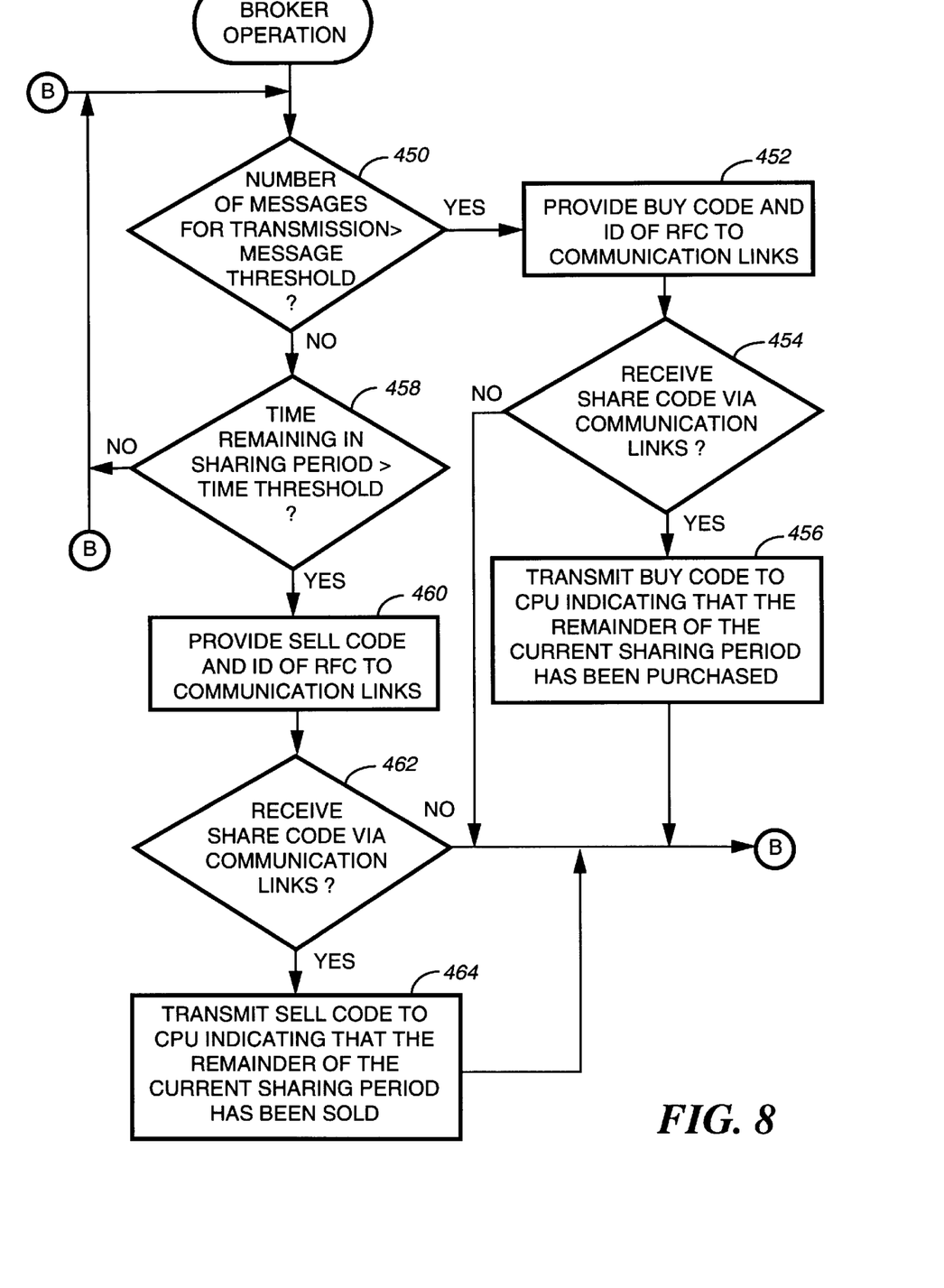
FIG. 8 is a flowchart depicting an operation of a broker included in the radio frequency controller of FIG. 6 in accordance with the present invention.

FIG. 8 is a flowchart depicting an operation of the broker 350, which references the transmission memory 320, the controller memory 345, and the clock 315 after activation. When, at step 450, the number of messages awaiting transmission exceeds the message threshold, which can be a number, value, or rate, the broker 350 determines that an attempt should be made to buy transmission resources, e.g., time or frames, on the shared communication medium. This determination can be made during any unassigned sharing period or upon expiration of an assigned sharing period. The broker 350 then, at step 452, provides the buy code and identification information to the communication links 305 for transmission to the trading center 105. It will be appreciated that the transmission of identification information may be unnecessary in some circumstances, such as when a dedicated line couples the RFC 110 and the trading center 105 or when the RFC 110 is the only transmission device that would be requesting additional transmission resources during a particular time.

When, at step 454, the share code is received responsive to transmission of the buy code, the broker 350, at step 456, indicates to the CPU 310 that additional transmission resources are now available, i.e., that the remainder of the current sharing period has been purchased. This can be done, for instance, by signaling the CPU 310 with the buy code. The RFC 110 can then transmit messages until the current sharing period is over. It will be appreciated, however, that the RFC 110 could subsequently attempt to sell back time on the current sharing period, such as when the backlogged messages are transmitted before the remainder of the purchased period is over.

When, at step 458, the time remaining in a sharing period currently allocated to the RFC 110 exceeds the time threshold, which can be a number, value, or rate, the broker 350 attempts to sell the remaining time. This is done by providing, at step 460, the sell code and identification information to the communication links 305 for transmission to the trading center 105. When a responsive share code is received, at step 462, the broker 350 indicates to the CPU 310, at step 464, that transmission during the current sharing period should cease. Should the number of messages subsequently exceed the message threshold, the broker 350 can attempt to purchase transmission resources via the trading center 105.

In summary, the communication system described above includes a communication medium, such as a base station or a communication channel, which can be shared by two or more transmission devices according to a default sharing pattern that defines different sharing periods allocated to the different transmission devices. When a transmission device determines that it does not need to transmit during assigned periods, the device can attempt to sell the remainder of sharing periods that are not needed. Alternatively, when a transmission device needs to transmit messages during unassigned periods, it can attempt to buy a portion of any unassigned period.

According to the present invention, a trading center included in the communication system is coupled to the transmission devices for managing the buy and sell requests and for modifying the default sharing pattern, when necessary, in response to traffic handled by the transmission devices. When, for instance, a large number of buy transactions have been attempted by a first transmission device and a large number of sell transactions have been attempted by a second transmission device, the trading center can automatically alter the sharing pattern to allocate more transmission resources to the first device and reduce the transmission resources available to the second device. As a result, the shared communication medium can be efficiently utilized, and the need for subsequent buy and sell transactions can be conveniently minimized.

It will be appreciated by now that there has been provided a more effective way of managing shared media in a communication system.

What is claimed is:

1. A communication system including a shared communication medium for providing messages, the communication system comprising:

transmission devices for transmitting the messages over the shared communication medium during periods defined by a sharing pattern, the transmission devices comprising means for buying time on the shared communication medium during unassigned periods when the messages are awaiting transmission and for selling time on the shared communication medium during assigned periods when no messages are awaiting transmission; and a trading center coupled to the transmission devices for modifying the sharing pattern used by the transmission devices in response to traffic handled by the transmission devices.

2. The communication system of claim 1, wherein the transmission devices comprise radio frequency controllers for transmitting the messages within different transmission zones.

3. The communication system of claim 1, wherein the shared communication medium comprises a communication channel.

4. The communication system of claim 1, wherein the shared communication medium comprises a base station located in transmission zones associated with the transmission devices.

5. The communication system of claim 1, wherein the trading center comprises:
   a trader for managing buying and selling of time on the shared communication medium;
   a monitor coupled to the trader for monitoring buying and selling of time and for modifying the sharing pattern in response to buying and selling attempts exceeding a threshold; and
   communication links coupled to the monitor for providing a modified sharing pattern to the transmission devices, wherein the shared communication medium is thereafter shared according to the modified sharing pattern.

6. The communication system of claim 5, wherein the trading center further comprises:
   a sharing record for storing requests to buy and sell time from the transmission devices; and
   a billing database for storing information about completed sharing transactions.

7. The communication system of claim 5, wherein the transmission devices comprise:
   a memory for storing the sharing pattern and for replacing the sharing pattern with the modified sharing pattern when provided;
   a clock for providing time values;
   a processing unit for using the shared communication medium during assigned periods determined with reference to the clock and the memory; and
   a broker coupled to the processing unit for providing, during an unassigned period, a buy code to the trading center in response to determining that a number of messages awaiting transmission exceeds a message threshold and for providing, during an assigned period, a sell code to the trading center in response to determining that no messages await transmission and that an amount of time remaining in the assigned period exceeds a time threshold.

8. A communication system including a shared communication medium for providing messages, the communication system comprising:
   transmission devices for transmitting the messages over the shared communication medium during assigned periods defined by a sharing pattern, the transmission devices comprising a broker for transmitting, during an unassigned period, a buy code in response to determining that a number of messages awaiting transmission exceeds a message threshold and for providing, during an assigned period, a sell code in response to determining that no messages await transmission and that an amount of time remaining in the assigned period exceeds a time threshold; and
   a trading center coupled to the transmission devices for managing buying and selling of time on the shared communication medium and for modifying the sharing pattern used by the transmission devices in response to receiving a number of buy and sell codes that exceeds a modification threshold.

9. The communication system of claim 8, wherein the transmission devices comprise radio frequency controllers.

10. The communication system of claim 8, wherein the shared communication medium comprises a communication channel.

11. The communication system of claim 8, wherein the shared communication medium comprises a base station.

12. The communication system of claim 8, further comprising:
   communication links for coupling the trading center and the transmission devices to transmit the buy codes, the sell codes, and any modified sharing pattern.

13. A method for sharing a communication medium in a communication system comprising transmission devices for transmitting messages over the communication medium and a trading center for managing sharing of the communication medium, the method comprising the steps of:
   the transmission devices transmitting the messages over the communication medium during assigned periods defined by a sharing pattern;
   the transmission devices transmitting, during an unassigned period, a buy code to the trading center in response to determining that a number of messages awaiting transmission exceeds a message threshold;
   the transmission devices transmitting, during an assigned period, a sell code to the trading center in response to determining that no messages await transmission and that an amount of time remaining in the assigned period exceeds a time threshold;
   the trading center modifying the sharing pattern to generate a modified sharing pattern in response to determining that buy and sell activity exceeds a modification threshold; and
   the trading center providing the modified sharing pattern to the transmission devices, which thereafter share the communication medium in accordance with the modified sharing pattern.

14. The method of claim 13, further comprising, in the transmission devices, the steps of:
   receiving the modified sharing pattern;
   replacing the sharing pattern with the modified sharing pattern in memory; and
   subsequently transmitting over the communication medium in accordance with the modified sharing pattern.

15. The method of claim 13, wherein the modifying step includes the steps of:
   determining that an evaluation time has arrived;
   determining a number of buy codes stored in a sharing record;
   determining a number of sell codes stored in the sharing record; and
   modifying the sharing pattern to provide additional transmission resources on the communication medium for a first transmission device and to reduce transmission resources on the communication medium for a second transmission device responsive to the number of buy codes and the number of sell codes.

16. The method of claim 13, further comprising, in the trading center, the steps of:
   receiving a buy code from a first transmission device;
   receiving a sell code from a second transmission device; and
   transmitting a share code to the first and second transmission devices indicating that a sharing transaction can commence.

17. The method of claim 16, further comprising the steps of:

the second transmission device refraining from transmitting during a remainder of a current sharing period in response to receiving the share code; and the first transmission device transmitting during the remainder of the current sharing period in response to receiving the share code.

18. The method of claim 17, further comprising, in the trading center, the step of:

storing billing information about completed sharing transactions.

* * * * *